Oct. 10, 1967  W. E. BRIGGS  3,345,860
VACUUM SYSTEM INLET VALVE
Filed Feb. 16, 1965  4 Sheets-Sheet 2

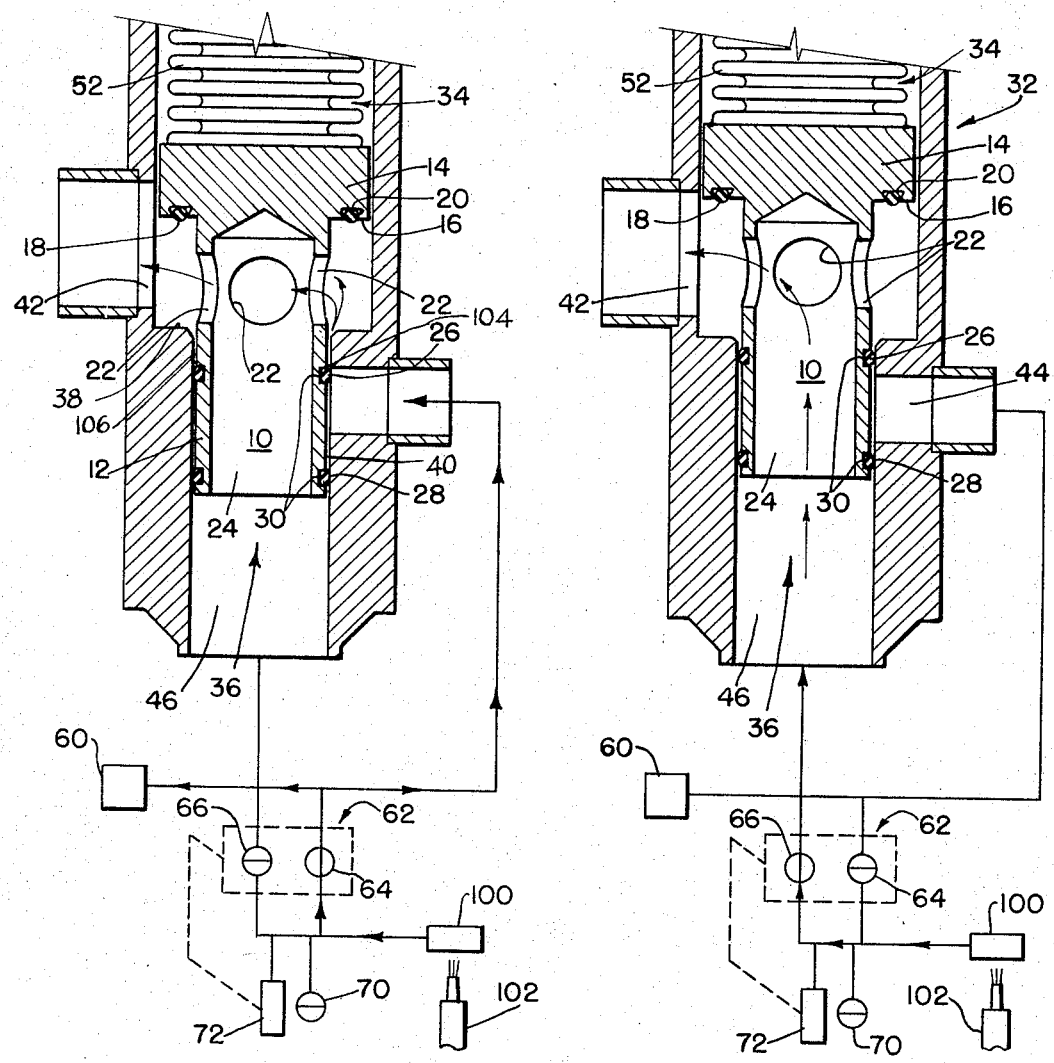

United States Patent Office 3,345,860
Patented Oct. 10, 1967

3,345,860
VACUUM SYSTEM INLET VALVE
Walton E. Briggs, Lynnfield, Mass., assignor to National Research Corporation, Cambridge, Mass., a corporation of Massachusetts
Filed Feb. 16, 1965, Ser. No. 433,093
8 Claims. (Cl. 73—40)

ABSTRACT OF THE DISCLOSURE

An inlet valve for leak detectors or the like with a combination of throttle valve and inlet valve functions. The valve structure has a cylindrical valving member moving in a tunnel with a restricted annular passage therebetween and spaced ports in the valving member and body and sealing means providing the combination of functions.

---

Figure 1:
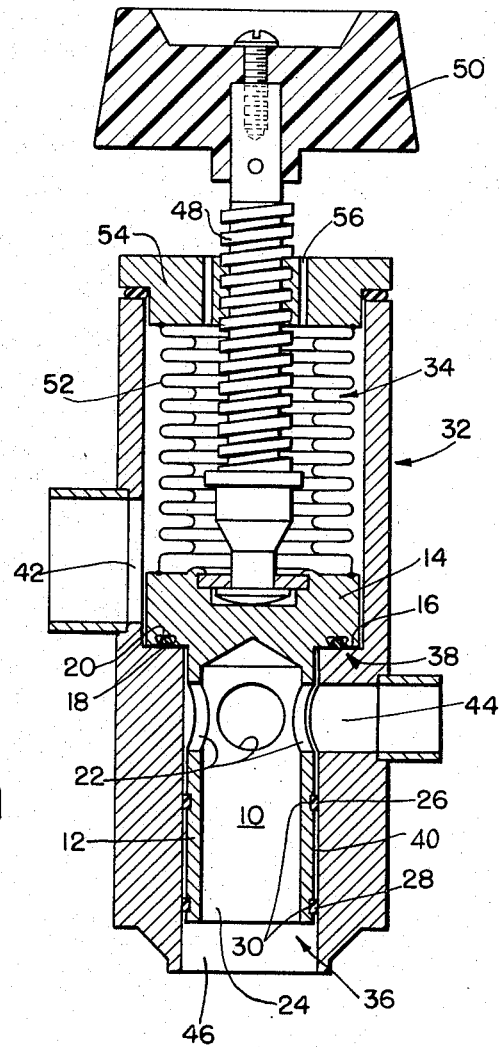

This application is a continuation-in-part of application S. N. 406,508 filed Oct. 26, 1964 and now abandoned.

The present invention relates to vacuum valves and more particularly to an inlet valve for a vacuum leak detector system.

A leak detector system has a rough vacuum section for pumping sample volumes to be tested down to vacuum levels on the order of one to ten microns or as low a pressure as inexpensive rotary mechanical pumps can achieve. The system also has a fine vacuum zone, including a diffusion or sorbing pump, for further pumping the sample volume down to high vacuum (one-tenth or smaller fraction of a micron pressure). At this low pressure a mass sensitive device, such as a hot filament mass spectrometer, can be operated to detect tracer gas with a high degree of sensitivity. The rough vacuum section may be part of the sample volume system or part of a commercial leak detector unit.

Occasionally, a sample volume with a gross leak is tested. The leak is so large that the volume cannot be reduced to low pressure by the pump of the rough vacuum section. Since the mass sensitive member cannot operate at pressures above fine vacuum (e.g. tenths of a micron) and since the fine vacuum system cannot operate until rough vacuum is achieved, the sample must be rejected or set aside for finding the gross leak by other techniques and plugging the gross leak before returning the sample to the leak detector for tracing small leaks.

It is the principal object of the present invention to improve leak detection operation by providing means for allowing testing for gross leaks.

It is a related object that such means will not interfere with normal testing operations of the leak detector.

These objects are realized by the provision of an improved inlet valve for the fine vacuum section of a leak detector. The principal feature of the valve is a restricted passage between a movable valving member and valve body. The passage is used to throttle relatively high pressures which appear in the rough vacuum section down to a fine vacuum section input which can be reduced to fine vacuum levels by the pump in the latter section.

Now, throttle valves are well known in many analogous arts and most commercial leak detectors have on-off type inlet valve means of some form for making the inlet valve connections incident to the pumpdown stages of leak detection, viz.:

(1) sample volume to rough vacuum section;
(2) sample volume to fine vacuum section;
(3) rough vacuum section to fine vacuum section.

The advantage of the present invention is that it combines the throttle valve and inlet valve functions in a single valve without impairing the performance of either function. In particular, the valve of the present invention provides an adjustable throttle which is sufficiently sensitive for a leak detector, reliable and easy to use by an unskilled operator.

Other objects, features and advantages of the invention will be obvious in part and will in part be indicated below.

The invention comprises an improved inlet valve for leak detectors and other vacuum systems wherein throttling and multi-way connection operations are performed.

Figure 2:
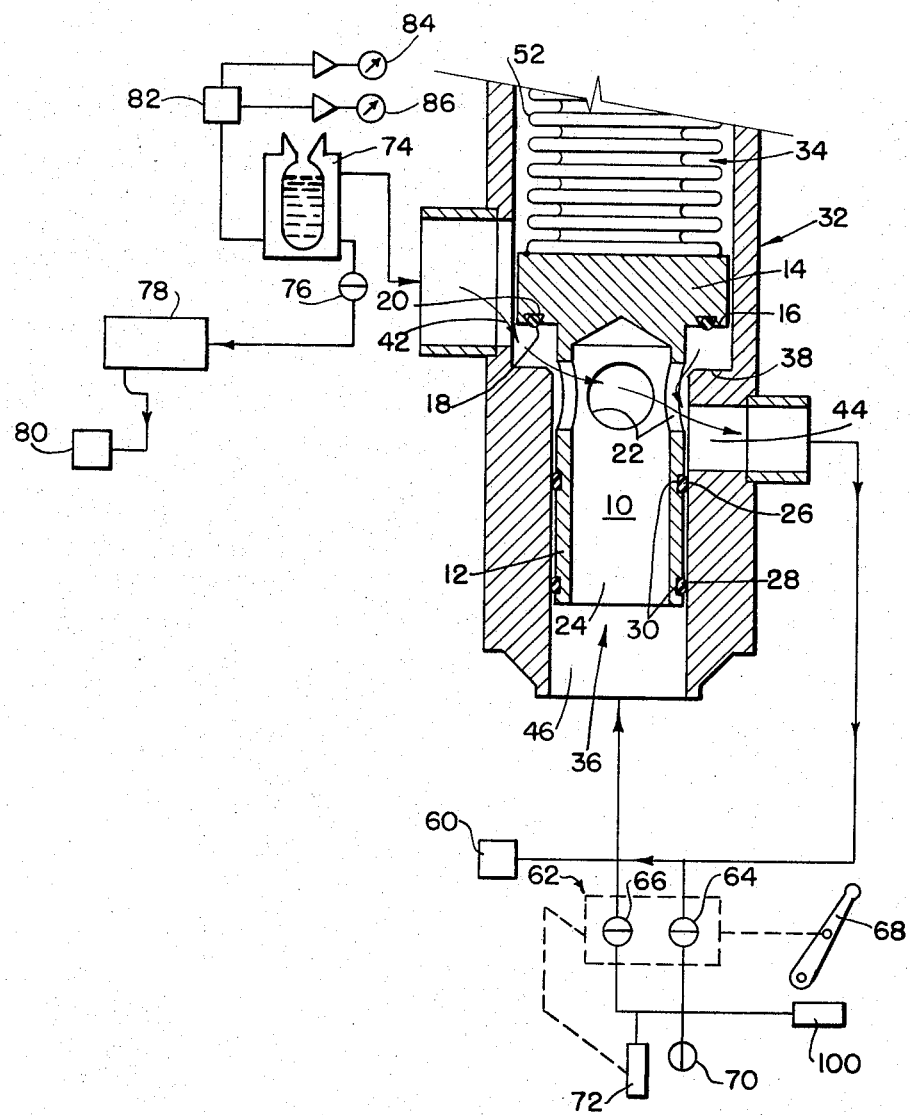
Figure 3A:
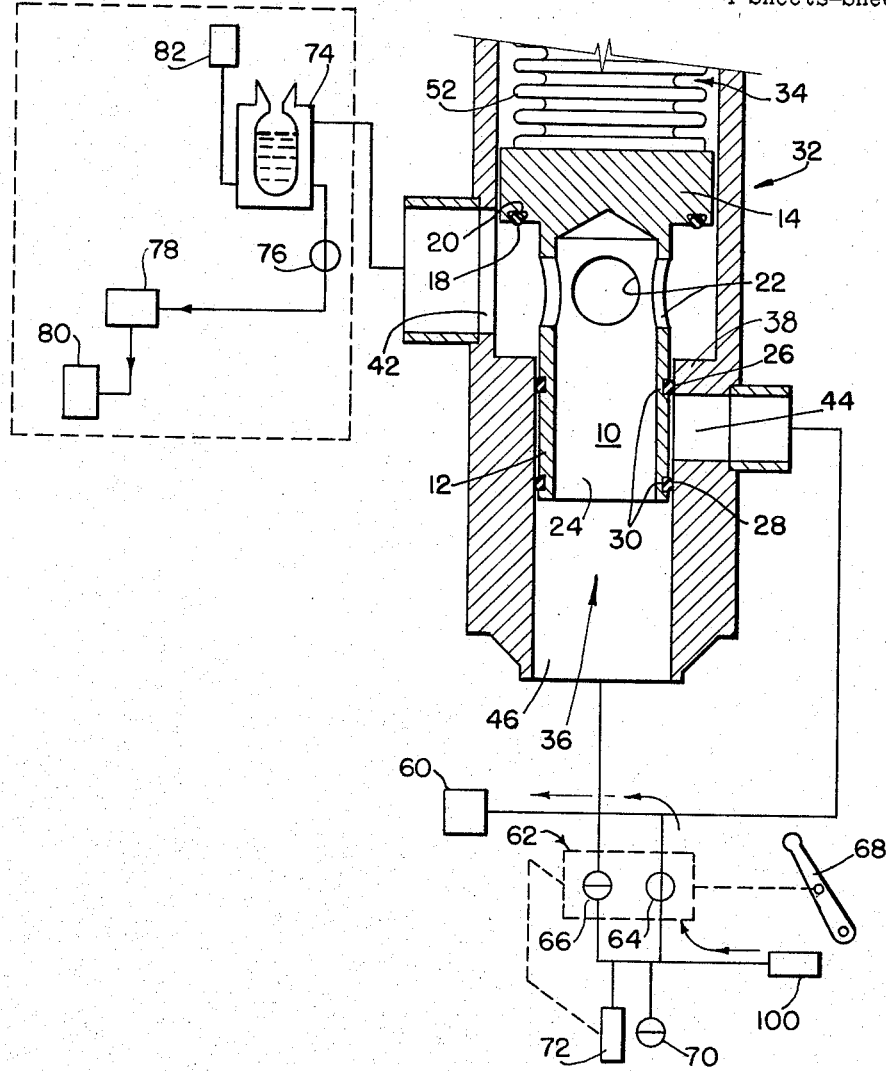

The invention is explained in the detailed description of a preferred embodiment below which description is to be read in connection with the accompanying drawings wherein:

FIG. 1 is a sectional view of an improved valve according to the preferred embodiment of the invention, the valve being in its "closed" position;

FIG. 2 is a partial section view of the same valve with a portion of the valve body cut away, the valve being in "partially open" valve position for "intermittent" system vacuum pumping (in contrast to steps performed in the "cyclic" operations of FIGS. 3A and 3B or 3C; the figure also shows the incorporation of the valve in a leak detector vacuum system; and FIGS. 3A, 3B and 3C are partial sectional views showing the cyclic operation of the valve, it being understood that the valve and system in these figures is the same as in FIGS. 1 and 2, FIGS. 3A and 3B indicating "full open" valve position for cyclic roughing and normal leak testing steps, FIG. 3C indicating "partially closed" valve position for gross leak testing.

Valve

Referring now to FIG. 1, there is shown in section a preferred embodiment of the vacuum valve. The components of the valve and their corresponding reference numbers are described below in sections (a)–(e):

(a) The first component is a valving member 10 composed of a hollow-walled cylindrical extension 12 capped by a disc 14.

The disc 14 extends radially (laterally) outward of the extension to provide an annular shoulder 16, accommodating a vacuum seal in the form of a rubbery O-ring 18 nested in a groove 20.

(b) There are first and second openings spaced along the length of the cylindrical extension 12.

The first opening has the form of a circumferential series of four ports 22 which are axially aligned with each other and equally spaced circumferentially on the extension. The second opening is the open end 24 of the extension 12. There are also provided first and second seal means along the extension which consist of O-rings 26 and 28 nested in grooves 30 in the outer surface of the extension. The axial spacing from the shoulder 16 to port(s) 22 is equal to the axial spacing from port 22 to O-ring 26. The valving member is mounted in a (c) valve body 32. This is machined to provide a plenum volume 34 and a tunnel volume 36.

The plenum volume has a shoulder 38 at the junction of the plenum and tunnel to provide a seat for the O-ring 18. The tunnel cooperates with the extension 12 of the valving member 10 to provide an annular space 40 between the extension and tunnel. This space is on the order of a few thousandths of an inch. For instance, the tunnel may be manufactured to a specified inner diameter of 1.002 inches inner diameter with a +.002 tolerance with the extension being 1.000 inch outer diameter −.002 tolerance. The O-rings 26 and 28 are compressed in this space to provide the vacuum tightness necessary for leak detector cycling. The body also provides (d) a first body port 42 connected to the plenum 34; a second body port 44 connected to the tunnel 36, more specifically to the annular space 40; and a third port 46 connected to the tunnel 36.

The port 44 is located close to the junction of the plenum and tunnel volumes in order to cooperate with the valving member as described below under Operation. The second port 46 located at the end of the body is always in communication with the opening 24 of the valving member regardless of the axial position of the valving member within the valve body. The valve also comprises (e) a threaded stem 48 and handle 50 for axially actuating the valving member 10 from outside the valve body through a bellows seal 52. A bonnet 54 is mounted on the valve body and contains a threaded opening for the stem and ports 56 to vent the interior of the bellows to atmospheric pressure.

The valving member 10 and its actuating means (stem 48 and seal 52) are so arranged that atmospheric pressure on the valving member 10, acting against the vacuum conditions in the valve body, aids in controlling the movement of valving member 10. The area of disc 14 exposed to ambient pressure via vents 56 is made greater than the opposing area of shoulder 16 exposed to pressure in the plenum volume.

While the use of the valve in a system is described below under Vacuum System, it should be noted at this point that at some point of operation the valve body port 42 is connected to a fine vacuum zone while the ports 44 and 46 are connected to zones of rough vacuum. In general "rough vacuum" as used herein means pressures in excess of one micron such as are produced by mechanical or cryosorption roughing pumps and "fine vacuum" refers to lower pressures such as can be produced by diffusion, ejector, sublimation, getter ion, cryogenic and cryosorption vacuum pumps. The construction and arrangement of the valve provide a variable throttle between the rough and fine vacuum zones which can be used to advantage as described below under operation.

The position of the valving member 10 shown in FIG. 1 is the "closed" position of the valve in which there is no communication between the ports 44 and 46 on the one hand and port 42 on the other hand. However, there is free communication between the ports 44 and 46. This position is particularly useful when air releasing the rough vacuum zone, servicing it (i.e. occasional maintenance functions) and repumping it, and all the while holding the fine vacuum zone at its low operating pressure. While air releasing, the balance of pressures across the valving member works against O-ring 18, but the seal is sufficient to allow maintenance of the pressure differential from fine vacuum to atmospheric. After pumping to rough vacuum again, the balance of pressures aids in sealing seal 18.

*Vacuum system*

Referring now to FIG. 2, the valve is shown as incorporated in a leak detector system. The rough vacuum section of the system consists of a rotary roughing pump 60 and a sequencing valve assembly 62. The sequencing valve assembly comprises a first valve 64 and a second valve 66. The assembly also comprises an operating handle 68 which operates the assembly in conjunction with a motor (not shown). The assembly also comprises an air release valve 70 and a pressure gauge 72.

Samples volumes such as a transistor casing or a bulb 100 is connected to the inlets of valves 64 and 66. The outlet of valve 64 is connected to the roughing pump 60 and to port 44 of the inlet valve. The outlet of valve 66 is connected to the port 46 of the inlet valve.

The fine vacuum section of the leak detector comprises a vacuum cold trap 74. Connected to the trap through a valve 76 is a diffusion pump 78 and a backing mechanical pump 80. A roughing pump (not shown) is also provided for the fine vacuum section. A mass spectrometer 82 is connected to the cold trap 74. The spectrometer is tuned to the mass/charge ratio of a trace gas (e.g. helium). The collector of the mass spectrometer provides a signal which is amplified and fed to a meter 84 for indicating the magnitude of a leak. There is also provided a pressure meter 86 for indicating pressure in the fine vacuum section.

When the leak detector is to be placed into operation, the air release valve 70 is closed and the handle 68 is worked to open the valve 64. The inlet valve is partially opened by moving the valving member 10 to the position shown in FIG. 2. The valve 76 is closed.

The rough pump is operated to evacuate the rough vacuum section via valve 64 and to evacuate the fine vacuum section via port 44 (second body port) of the inlet valve.

*Operation*

The leak detector is then ready for repetitive leak test operations which are described with reference to FIGS. 3A–3C and the description of which is divided into two types—normal leak test cycles and gross leak test cycles.

*FIGS. 3A–3C*

FIG. 3A shows the valve positions during the initial roughing stage of each repetitive leak test cycle. FIG. 3B shows the valving for the second stage of a leak test cycle—leak testing for a normal cycle and FIG. 3C shows the valving for the second stage when a gross leak is encountered.

*Normal leak test cycle*

Referring to FIG. 3A, the inlet valve is shown with valving member 10 in the fully open position.

The sample 100 is connected to the system and the air release valve 70 is closed. The handle 68 is operated to open valve 64. The roughing pump is operated to evacuate the sample volume 100.

During this stage, while pressure in the sample volume is being lowered from atmospheric to rough vacuum, the inlet valve second body port is cut off from communication with the fine vacuum section by the second valving member seal O-rings 30 which straddle the port.

When pressure in the sample volume and roughing section touches the desired level, pressure gauge 72 indicates this connection and operates a motor to open valve 66 and and close valve 64.

Referring now to FIG. 3B, the inlet valve valving member 10 remains in its open position providing an open flow path between the rough vacuum and fine vacuum sections via:

the third body port 46
the tunnel volume 36 of the body
the second valving member opening 24
the hollow interior of the valving member
the first valving member opening 22
the plenum volume 34 of the body
the first body port 42

The low pressure air passing through the inlet valve is furtheir pumped by the fine vacuum section pumps down to a pressure compatible with mass spectrometer operation. Then the mass spectrometer is operated, and trace gas is sprayed over the exterior of the sample by a probe jet 102. The trace gas passes through leaks (if any) in the sample and goes through the valve 66 and inlet valve to the fine vacuum section where it is detected by the mass spectrometer.

*Gross leak cycle*

Referring again to FIG. 3A, it sometimes happens that the pressure in the rough vacuum system never gets low enough to trigger the above automatic operation of the valve assembly 62 (i.e., closing valve 64 and opening valve 66). This is usually because a leak or leaks in sample 100 are too large relative to the capacity of pump 60 to evacuate in a short time. It would not be feasible then to connect the fine vacuum section to the sample because the fine vacuum pumps 74 and 78 are less suitable for handling the gross leaks than pump 60.

When this situation is encountered the operator moves valving member 10 to the partially closed position of FIG. 3C. Then the rough vacuum section is connected to the fine vacuum section via:

the second body port 44
the restricted opening 104 between one of the gaskets 30 and a portion of port 44
the restricted annular opening 106 between the valving 10 and the body tunnel volume 36
the plenum volume 34 and openings 22
the first body port 42

The operator adjusts the position of valving member 10 to vary opening 104 according to the size of the gross leak. The restrictions 104 and 106 provide a limited leakage which is easily handled by the fine vacuum section pumps and then trace gas is sprayed over the sample 100 to find the gross leaks. When the trace gas probe 102 is directed at a gross leak, a sufficient amount of trace gas passes through the restrictions 104, 106 to be detected by the mass spectrometer.

After completion of the gross leak test, and closure of valve 64, the inlet valve is moved back to its full open position (FIG. 3A) in preparation for the next leak test cycle.

What is claimed is:

1. A vacuum valve for three-way connections and throttling operations in a leak detector or the like, comprising in combination,
  (a) a valving member which has a hollow cylindrical extension capped at one end with a disc which extends laterally beyond the hollow wall extension to provide a shoulder and a seal on the face of said shoulder adjacent the extension,
  (b) first and second spaced openings along the length of the extension, the first opening being comprised of a series of apertures along the circumference of the opening, the apertures of said first opening being axially close to said shoulder, the second opening being provided by the open end of said hollow extension, and vacuum seal means mounted on the exterior of the hollow wall extension between the said first and second openings, the seal means comprising a pair of axially spaced O-rings mounted on the extension,
  (c) a valve body providing a plenum volume connected to a tunnel volume, with the valving member capping disc being accommodated in said plenum volume and the valving member hollow wall extension being accommodated in said tunnel, the tunnel providing a narrow annular metering passage around the extension except where sealed by the said spaced O-rings; the body providing, at the junction of said plenum and tunnel, a seat for the above-said seal which is mounted on the shoulder of the valving member (a),
  (d) a first body port connected to said plenum, a second body port connected to the said annular passage at a point close to the junction of the tunnel and plenum, and a third port connected to the tunnel volume beyond the end of the extension so that the third port is in continuous communication with the tunnel regardless of axial movement of the valving member, and
  (e) means for actuating the valving member axially and comprising a screw threaded stem connected to the valving member at the face of the valving member capping disc which faces away from the member, a bonnet on the valve body with a threaded passage for the stem and a bellows connected to the valving member and bonnet and surrounding the stem, and means for venting the interior of the bellows to ambient pressure.

2. The valve of claim 1 wherein the said first opening of the valving member hollow extension consists of four ports in the cylindrical wall of the extension, the ports being axially aligned along the wall and circumferentially spaced around the wall at equal intervals.

3. The valve of claim 1 wherein the said O-rings are mounted in spaced grooves on the exterior wall of the extension.

4. The valve of claim 1 wherein the axial space between the shoulder and first opening of said valving member is substantially the same as the axial space between said first opening and the nearest of said gaskets.

5. The valve of claim 1, wherein the bellows, stem and valving member discs are constructed and arranged so that the area along the disc face exposed to ambient pressure (via the venting means) is greater than any area along the opposite disc face exposed to the pressure within the plenum volume.

6. In vacuum apparatus, the combination of means for providing a rough vacuum connected to a volume to be evacuated through a first vacuum line, means for producing a fine vacuum connected to said volume through a second vacuum line, means for selectively controlling communication from said volume through said first and second lines, and inlet valve apparatus for controlling gas flow in said second vacuum line, inlet valve apparatus comprising,
  (a) a hollow valving member which has an axially extending wall and a lateral shoulder, with first vacuum seal means extending from said shoulder,
  (b) first and second spaced opening means along the wall of the hollow valving member providing access to its interior and second vacuum seal means mounted on the wall,
  (c) a valve body providing a plenum space with a seat for said lateral shoulder and said first vacuum seal means and providing a tunnel communicating with said plenum, the tunnel accommodating the valving member so that a narrow passage is formed therebetween, which passage is sealed by said second vacuum seal means,
  (d) a first body port connecting said plenum to the means for producing fine vacuum, a second body port connecting the tunnel to a bypass extension of the first vacuum line and a third port connected to said tunnel and also connected to the system to be evacuated by said first line,
  (e) means for actuating the valving member to move within the tunnel and plenum.

7. The apparatus of claim 6 with the said valving member (a) comprising a cylindrical extension capped at one end with a disc which extends laterally beyond said cylinder to provide an annular shoulder supporting said first vacuum seal, the said first opening means of (b) being located, at least in part, adjacent said shoulder and the said second opening means being located at the end of the cylindrical extension away from the disc, the tunnel and plenum of said valve body (c) comprising coaxial bores of different diameters with the seat for said first sealing means located in the plenum adjacent the junction of the tunnel and plenum, the second body port of (d) being arranged so that the first opening means of the valving member are aligned therewith when the shoulder of the vacuum member is seated in the plenum, and the third body port being located at the tunnel end away from the plenum to provide continuous communication with the said second opening of the valving member, and the said actuating means comprising means for providing atmospheric pressure in a direction to assist in seating the valving member's first sealing means.

8. The apparatus of claim 6 wherein a mass sensitive member is connected to the second line to enable the apparatus to be used for leak detection on the system to be evacuated.

References Cited

UNITED STATES PATENTS

| | | | |
|---|---|---|---|
| 138,143 | 4/1873 | Lee | 137—625.49 X |
| 2,071,204 | 2/1937 | Hunt. | |
| 2,320,905 | 6/1943 | Bateholts | 137—625.4 X |
| 2,851,057 | 9/1958 | Fraser | 137—625.4 X |
| 3,026,715 | 3/1962 | Briggs | 73—40.7 |

LOUIS R. PRINCE, *Primary Examiner.*

J. NOLTON, *Assistant Examiner.*